April 11, 1961  W. WHIPPLE  2,979,008
BULK LIQUID CARRIER
Filed May 10, 1960  7 Sheets-Sheet 1
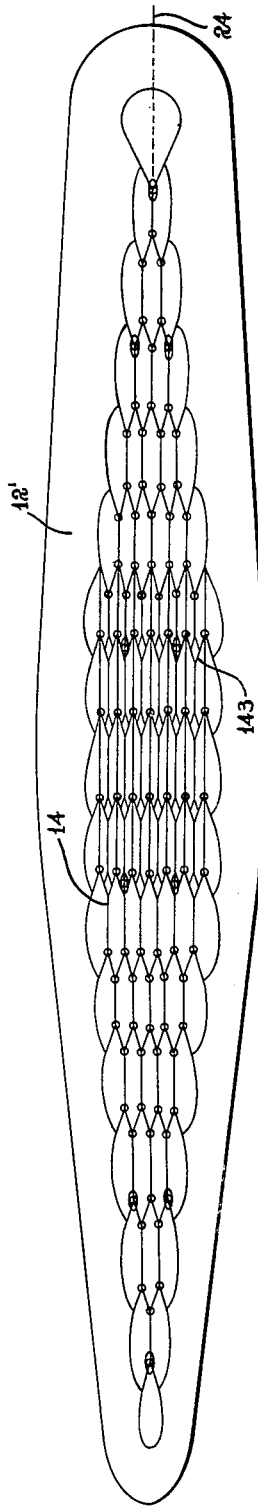
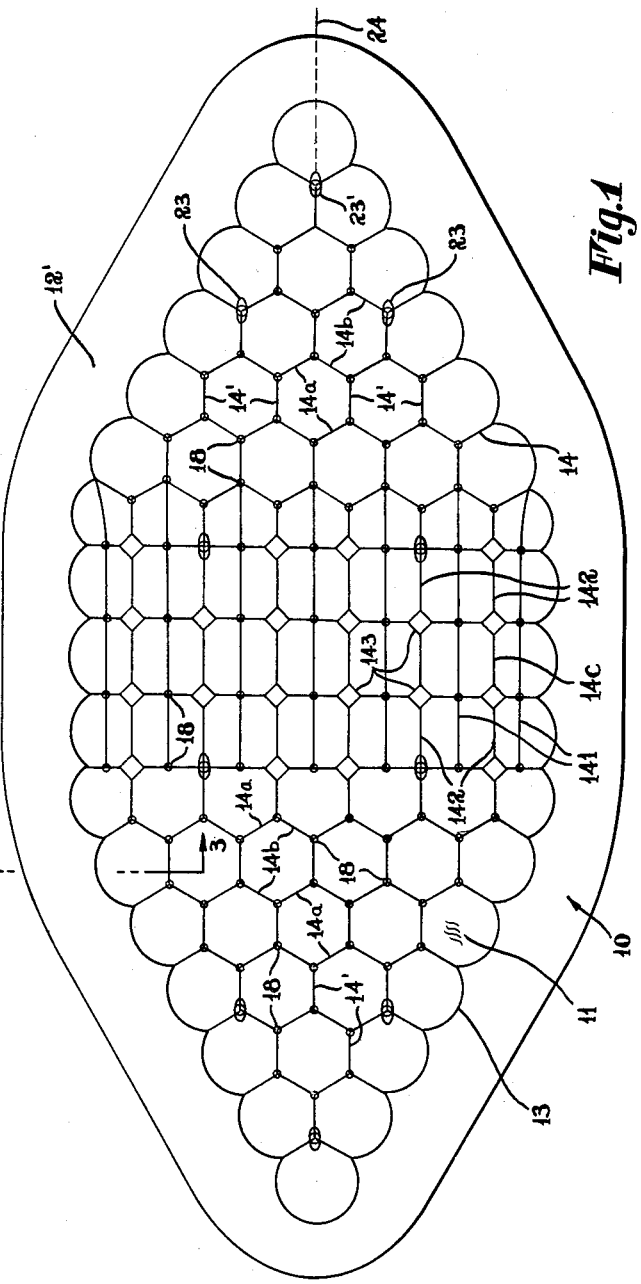
INVENTOR.
WILLIAM WHIPPLE
BY
Watson, Cole, Grindle &
Watson
ATTORNEYS April 11, 1961

W. WHIPPLE 2,979,008

BULK LIQUID CARRIER

Filed May 10, 1960

INVENTOR.
WILLIAM WHIPPLE
BY
Watson, Cole, Grindle &
Watson
ATTORNEYS

April 11, 1961     W. WHIPPLE     2,979,008
BULK LIQUID CARRIER

Filed May 10, 1960     7 Sheets-Sheet 4

INVENTOR.
WILLIAM WHIPPLE
BY
Watson, Cole, Grindle &
Watson
ATTORNEYS

April 11, 1961     W. WHIPPLE     2,979,008
BULK LIQUID CARRIER

Filed May 10, 1960     7 Sheets-Sheet 6

INVENTOR.
WILLIAM WHIPPLE
BY Watson, Cole, Grindle & Watson
ATTORNEYS

United States Patent Office 2,979,008
Patented Apr. 11, 1961

2,979,008

BULK LIQUID CARRIER

William Whipple, 3200 Bryn Mawr Drive, Dallas 25, Tex.

Filed May 10, 1960, Ser. No. 28,112

16 Claims. (Cl. 114—74)

This invention relates to a liquid cargo carrier designed primarily for the economical transportation at sea of very large quantities of liquids, including fresh water, which are lighter than salt water. However, it is not restricted to use in salt water, and may in fact be employed for transporting liquid cargos in fresh water where such cargos are of no greater, and preferably of somewhat less, specific gravity than fresh water.

It has been conventional practice in transporting liquids, such as oils and the like, to employ conventional tankers, which, though specifically constructed to be considerably more flexible than conventional ships, are nevertheless rigid structures for all practical purposes. The expense of tankers or other such rigid structures, the effect thereon of wave motions, hydrostatic internal pressure of the liquid cargo and the required power for propulsion purposes, imposes practical limits on the size of tankers.

In accordance with the present invention, there is utilized an entirely new concept of liquid cargo carrier, in which the carrier itself consists of an upwardly open sheath or envelope constructed primarily of flexible, liquid-impervious sheet material, lacking any rigid framework for maintaining it in a given shape, the general arrangement being such that the flexibility of the carrier permits it readily to yield and conform to wave motions in the sustaining sea water or fresh water, as the case may be, all without undue stress.

Such a carrier is especially adapted for use in conveying large quantities of fresh water from areas where such water is abundant to areas where a natural supply of fresh water is insufficient. In such use a cover for the upwardly opening carrier will generally not be necessary, inasmuch as the loss of small amounts of the fresh water, either over the side or by evaporation, as well as the mingling of small amounts of sea water with the fresh water, will be normally comparably immaterial in extent. Moreover, the omission of a cover avoids the difficulties of devising such a cover which would not unduly interfere with the reaction of the carrier to wave motions as herein described.

It is a further feature of the invention to utilize such a carrier, in which the level of the upper surface of the liquid cargo contents of the carrier, when full, will normally be just slightly above the level of the sea water in which the carrier floats and the external pressure of the sea water against the flexible sides of the carrier will oppose and at least partially balance the internal hydrostatic pressure of the cargo, the carrier being completely flexible and yieldable to permit such a balancing condition to be attained, thereby avoiding stresses which would be exerted on a rigidly constructed carrier.

A further and extremely important feature of the invention consists in utilizing one or more main networks, preferably formed of substantially constant length, flexible tension elements such as cables. These are connected at a plurality of locations, both around the upper peripheral edge of the cargo carrier wall to maintain the wall in an upwardly disposed condition, and preferably are also connected to said wall at various levels throughout its vertical extent, to better enable it to resist outward pressure with minimum stress in the material of the wall.

An essential characteristic of such a main network is that it have the characteristic of being simultaneously stretchable in the direction of tow and contractible in a relatively transverse direction, so that exertion thereon of a towing force, will result in the stretching or lengthening out in a fore-and-aft direction of the network and a simultaneous transverse contraction. This deformation by elongation and simultaneous transverse contraction is shared also by the bottom of the liquid-impervious envelope or sheath of the carrier, due to the transmission of the elongating and narrowing forces thereto from the said network structure or structures and the elasticity of the sheath itself. This elongation of the sheath bottom may be provided either by use of stretchable materials or constructing so that it extends outwards from points of attachment to cables, except when fully extended.

It is a further feature of the invention to provide a lower network of tension elements overlying and resting on the bottom of the carrier and secured at numerous points or incorporated therein, whereby to cooperate with and support the bottom. Furthermore, the invention contemplates transmitting the towing force to both the upper and lower networks, in order that both may exert similar and simultaneous action on their respective portions of the carrier envelope, and may bear the major stresses and generally distribute such stresses generally throughout the entire area of the envelope.

In the accompanying drawings there is illustrated a preferred exemplification of the invention, simply by way of illustration of the preferred mode of carrying out the invention. In the said drawings:

Figure 1 is a plan view of a liquid carrier in accordance with the invention, same being shown on a comparatively small scale as it will appear when in fully filled or loaded condition and when at rest in the water;

Figure 2 is a view of the same structure shown in Figure 1, but showing the shape assumed by the carrier when moving forward in the water and subjected both to a towing force in a forward direction, together with the reversely directed force of resistance imposed thereon incident to its movement through a body of water;

Figure 13:
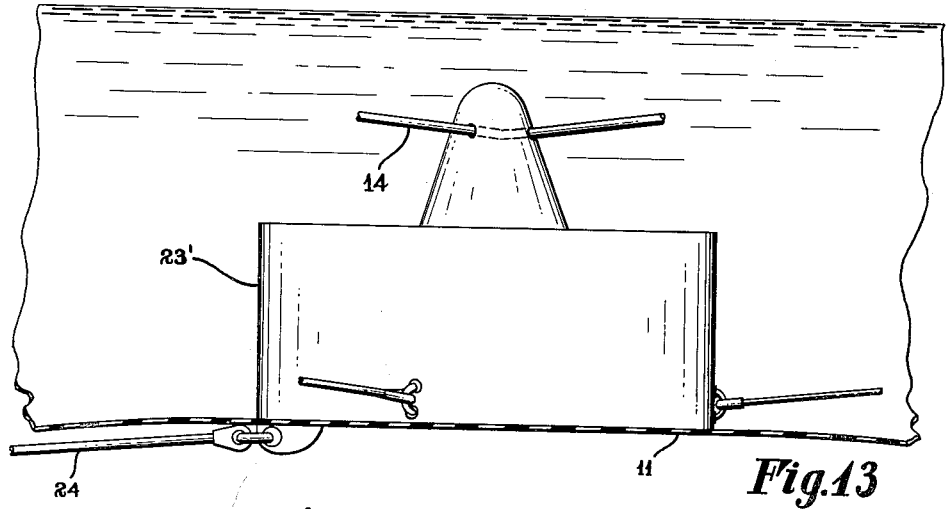
Figure 14:
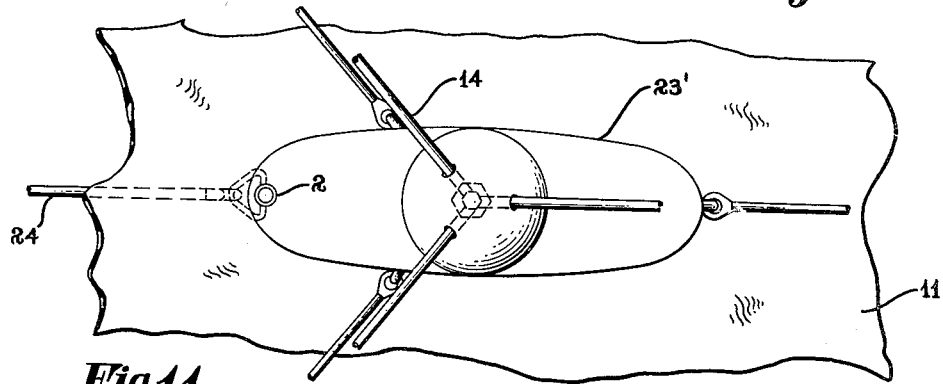
Figure 15:
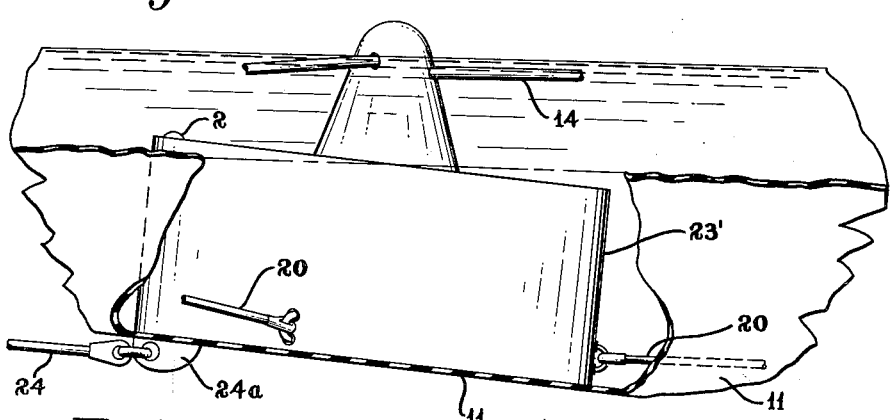

Figures 9, 10, 11 and 12, respectively, are fragmentary diagrammatic sectional views through the side wall of the carrier, showing the complete cycle of the action which occurs responsive to the reaction of the side wall of the carrier to a wave, beginning with the trough of the oncoming wave and ending with the trough which follows the said wave;

Figure 13 is a greatly enlarged detailed cross-sectional view of a diagrammatic nature showing a suitable device forming a tow connection at the bow of the carrier and also functioning to interconnect the upper and lower main cable networks to transmit the towing forces from one to the other;

Figure 14 is a plan view of the structure shown in Figure 13;

Figure 15 is a diagrammatic view generally similar to Figure 13, but showing the several parts and their relationships when the carrier is towed in its substantially empty condition.

Referring now in detail to the accompanying drawings and first considering Figure 1, the liquid carrier of the invention, which has no supporting rigid framework, consists essentially of a hull 10, which is in the form of a flexible liquid-impervious envelope, preferably of substantially oval shape and having a generally horizontal bottom 11, to the periphery of which is integrally connected an upwardly extending, flexible and collapsible marginal wall 12, which wall will thus be seen to peripherally surround the bottom 11. The carrier thus is open upwardly at 13. The sheath or envelope 10 is formed of a suitable flexible, and elastically stretchable, sheet material of a liquid-impervious nature, such as polyethylene plastic, natural or artificial rubber, or the like.

A horizontally disposed and horizontally deformable upper element or network 14 of substantially constant length, flexible tension members, extends across the upward opening 13 of the carrier and is connected to the upper peripheral edge of the carrier wall 12 at a plurality of locations around said wall, as is apparent from Figure 1. The horizontal tension exerted by network 14 will normally maintain a portion 12' of the wall extend substantially horizontally inwardly over the liquid contents of the carrier. Moreover, as may be seen in the more detailed Figures 3, 4, 7 and 8, the connection between this upper cable network 14 and the peripheral upper edge of the wall 12 may utilize a series of peripherally disposed floats 15 connected by tension elements 16 and 17, respectively, between the main cable network 14 and the wall 12. The function of the floats 15, as shown in Figures 3, 4, 5 and 6, is to assist in maintaining attached cables of network 14 near to the surface of the water, and also to allow additional freedom of movement with the waves of the three uppermost levels of cables relative to one another, and of adjacent connection points at each level relative to each other.

In addition, in order to maintain the main cable network 14 near the upper level of the liquid contents of the carrier, it is desirable to secure on this network 14 a suitable plurality of floats 18, thus buoyantly supporting the network on the carrier contents, these floats 18 being suitably distributed throughout the entire area of the cable network 14.

Figure 3:
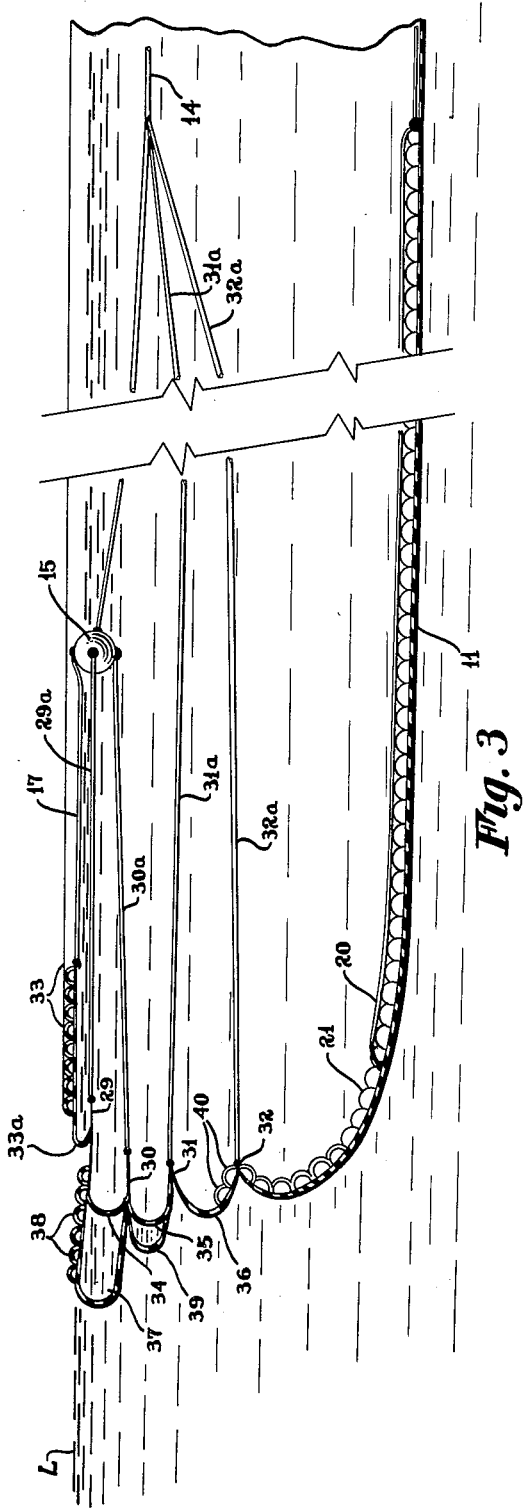
Figure 3 is an enlarged fragmentary view partially broken away and comprising a cross section on the line 3—3 of the structure shown in Figure 1.

A lower cable network or element 20, which is in substantial vertical registry with the network 14, and therefore not visible in Figure 1, and which lower network is designated by the reference character 20, and is attached to the upper surface of the envelope bottom 11, as is apparent in Figure 3. Network 20 is connected or secured to the marginal area of the bottom at a multiplicity of locations. The lower network 20 is intended thus to be submerged and therefore has no floats corresponding to the floats 18 of the upper network. In order to avoid undue sagging of the bottom under the weight of secondary cables of this network 20, and also of the upper network 14, particularly when the carrier is substantially emptied, as in Figure 4, it will be desirable to provide on the bottom a series of floats 21, preferably of relatively low buoyancy. Where the carrier is intended for use in salt water, these floats 21 may consist of hollow compartments formed of the same material as the envelope 10 and filled with fresh water, or other liquid of somewhat less specific gravity than the salt water in which the carrier is normally intended for use. Similar floats may be attached to main cables at the lower cable network, though such is not shown in this application.

It is intended that the towing force shall be imparted to the carrier through towing means connected to one or both of the cable networks above mentioned. In order to distribute this towing force between the said networks and to resist their relative longitudinal or lateral displacement, they are preferably interconnected at suitable intervals as by means of equalizer elements such as 23, 23', shown in detail in Figures 13, 14 and 15, and interconnecting the said upper and lower networks, except that the towing connections 24 and 24a are not required.

These same equalizer elements, such as 23', disposed at the bow end of the carrier and interconnected between the upper and lower networks 14 and 20 at a location along the major longitudinal axis of the carrier, and perhaps at other points, may also provide a convenient tow connection. To this end, the equalizer element 23' has its lower forward endge 24a projecting through the envelope bottom 11, the bottom 11 being secured therearound in water-tight manner, all to the end that a tow cable 24 may be connected to this projecting bottom portion to transmit a towing pull, through the element 23', to both the upper and lower cable networks 14 and 20. This same element 23 may also be used for anchoring.

An essential characteristic of each of the main cable networks 14 and 20 is that the towing force exerted on them and longitudinal stress created on the cable networks incident to this towing force, as opposed by the retarding hydrostatic and wave actions of the water on the envelope 14, be such that the networks be simultaneously elongated in the direction of the towing force, while at the same time being contracted in a generally transverse direction, and conversely. This action, of course, is transmitted to the envelope 12, the bottom 11 of which as above mentioned is of a sheet material capable of stretching or elastic elongation, so that when the carrier filled with liquid is under way with an effective towing force applied thereto, as seen in Figure 2, it will be elongated and at the same time considerably narrowed, as contrasted to its dimensions shown in Figure 1. Because of this, its resistance to passage through the water will be substantially decreased.

Any type of main networks having the aforesaid characteristic may be employed in the invention, and it is to be understood that the specific type of networks, both of which are similar to that shown in Figure 1, are merely for the purpose of exemplification. Thus, in Figure 1, it will be seen that the network 14 comprises a series of sections of flexible tension members fixedly interconnected to each other to form a network of deformable polygons, so devised as to maintain the substantially deformability of the network under the influence of the various sets of forces acting upon it, whether the carrier is full or emptied, at rest or in tow, and also while subject to wind and wave. At the bow and stern portions, respectively, there are provided triangularly disposed series of such polygons, having relatively adjoining sides, such as 14', extending in a longitudinal direction parallel to the direction of tow, together with generally transverse segments or sections 14a and 14b extending generally transversely of the direction of tow, so that a towing force transmitted longitudinally through the several interconnected sections 14', 14a, and 14b, will tend to collapse the respective polygons in a transverse direction while elongating them and thus will exert a corresponding over-all effect on the entire polygon network. A similar effect will obviously be produced with respect to the medial portion of the network generally designated by the reference character 14c, in which the polygons are of generally rectangular formation. These are so connected to the end sections of the network that the longitudinal towing forces transmitted through the network 14 will displace alternate longitudinal strands or elements 141, 142, respectively, in opposite directions. This will act through the relative angular displacement of sections of the transverse elements and through elongation of the diamond-shaped junctions 143 to elongate and narrow this medial section 14c.

In addition to being connected to the upper peripheral edge of the wall 12, the upper network 14, as shown best in Figures 3, 4, 7 and 8, has extending therefrom the series of additional secondary tension elements 29a, 30a, 31a, 32a, respectively connected to the wall 12 at different levels successively below the level of the upper edge, and normally below the level L of the body of water in which the carrier floats. It will be understood that there are provided a plurality of such tension elements at each level, these being fixedly anchored or connected to the wall 12 at their respective levels, at a multiplicity of points around the entire extent of the wall 12. These elements 29a, 30a, 31a and 32a, cause the foregoing elongating and narrowing of the network 14 to be transmitted to the envelope or hull 10 at each of the several levels. In addition, these elements 29a to 32a function locally to pull in the wall 12 throughout the entire level of each series of similarly designated elements. Thus, the wall will be caused to define a series of accordion pleats 29, 30, 31 and 32, respectively, as indicated in Figure 3, for facilitating the vertical collapsing and extension of the wall 12 and, in fact, for permitting simultaneously collapsing at some localities and vertical extension at others, such as will occur incident to wave action.

It is, of course, essential that the upper edge of the wall 12 be maintained at all times above the surface of the supporting liquid, as well as above the surface of the liquid contents of the carrier. To this end, in addition to the float or float yokes 15, the extreme upper and inner horizontal portion 12' of the wall 12 may have affixed thereto a series of air floats 33, as indicated in Figure 3.

Also, there may be provided a supplementary fold 33A to aid further to accommodate rising waves without overtopping.

The folds of the wall 12, designated by the numerals 34, 35 and 36, respectively, above and between the adjoining accordion pleats 29, 30, 31 and 32, will preferably be rendered partially buoyant, in order that when waves move the outer sections of the wall outward there will be no tendency for these sections to sink by reason of the greater water pressures within. This is preferably accomplished by the application of the surrounding auxiliary float means 37 with affixed air float chambers 38 adjacent the upper edge of the wall 12. The enclosed float chamber 37 will preferably contain a liquid of somewhat lesser density than the particular liquid in which the carrier is to float and be towed. Thus, where the carrier is adapted for use in salt water, the float 37 may advantageously contain fresh water. The float and its associated portion of the wall will rise and fall substantially with the wave action on the particular portion or locality of the carrier, and this rising and falling may vary throughout the length of the carrier, due to the flexibility of the entire structure, including the side wall 12 and float structure. If desired, a somewhat smaller float structure 39, containing a buoyant liquid, such as fresh water, may be secured around and externally of the fold 35, or other lower folds. In addition to providing buoyancy, these float structures constitute weight and bulk, preventing lower folds from rising when upper folds are driven back by waves.

The lowermost such fold 36 may have secured at its inner surface floats 40 containing fresh water, and advantageously be of the same type as the floats 21 of the outer portions of the bottom of the envelope. The purpose of the floats 40 and 21 is to support the numerous secondary cables above them when the carrier is partly or fully emptied. Alternately other forms of floats may be used to support these cables.

In the actual use of the invention, when same is filled with a liquid while afloat in a sustaining fluid, such as sea water, it will tend when at rest to assume a shape such as is shown in Figures 1 and 3 considered together. In this condition, the weight of the liquid will act on the side wall 12 and bottom 11 to depress the bottom to near maximum depth or draft and to conformingly extend the wall 12 downwardly to substantially the same depth. At the same time the liquid within the carrier will exert equal lateral pressures in all horizontal directions, thereby expanding the carrier and its envelope 10 transversely to substantially maximum width while correspondingly maintaining the length of these parts at their normal minimum.

However, when a towing force is applied to the tow cable or cables shown in the drawings, to urge the carrier through the surrounding sea water, this force will be opposed by the drag of the sea water against the hull or envelope 10. Thus, the towing forces will act upon both the upper and lower cable networks through the element 23' to simultaneously elongate and decrease the width of these networks or elements in the manner earlier mentioned. This simultaneous elongation and narrowing action is transmitted by the networks to the flexible hull or envelope 10, with the end result that the entire carrier structure is substantially elongated and narrowed to achieve a comparatively streamlined shape, such as indicated in Figure 2. This will accordingly decrease the resistance of the carrier to movement through the water.

Due to the flexibility of both networks on the envelope structure 10, it will be seen that the entire carrier structure and its liquid contents is free to yield with and conform to the wave action on the surface of the ocean or other sustaining body of water, whether full or emptied, at rest or extended, without having to endure the stresses comparable to those which must be withstood by a rigid hull of conventional structure. It is contemplated that, because of this quality, a carrier in accordance with the invention may be constructed of considerably greater size than is normally permissible with rigid hull structures or tankers and with a great saving in materials. Because of its great length, it is quite obvious that various portions of the carrier structure may be simultaneously subjected to the actions of different waves. This is readily accommodated by virtue of the structural features above described in detail. Moreover, in Figures 9 to 12, inclusive, there is diagrammatically illustrated the manner in which any selected transverse section or portion of the carrier structure reacts to wave actions, it being understood that the action of different portions of the carrier, particularly with respect to its length, will be different, in accordance with the phases and configurations of the different waves which they happen to be encountering at any given time.

In Figures 9 to 12, there are shown cross-sectional views through a preselected portion of one side of the carrier showing its relationship during various phases of a large wave, with respect to an elevation which may be regarded as substantially the median level of the water between the crests and troughs of the waves.

Figure 9:
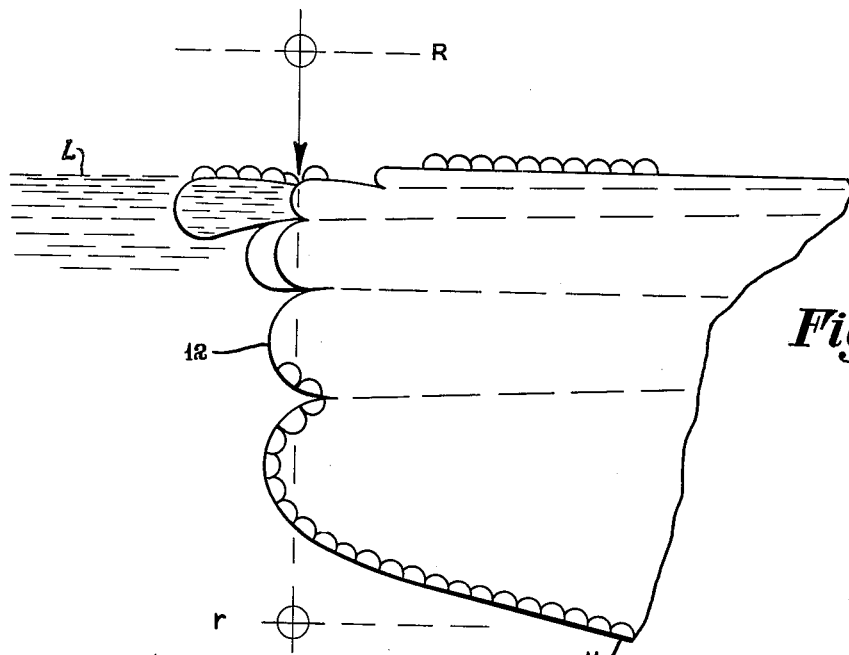

In Figure 9 the carrier is shown as it appears substantially at the trough of the wave, at which time its side wall 12 will be substantially collapsed, so that its upper edge portion is substantially below the reference level R.

Figure 10:
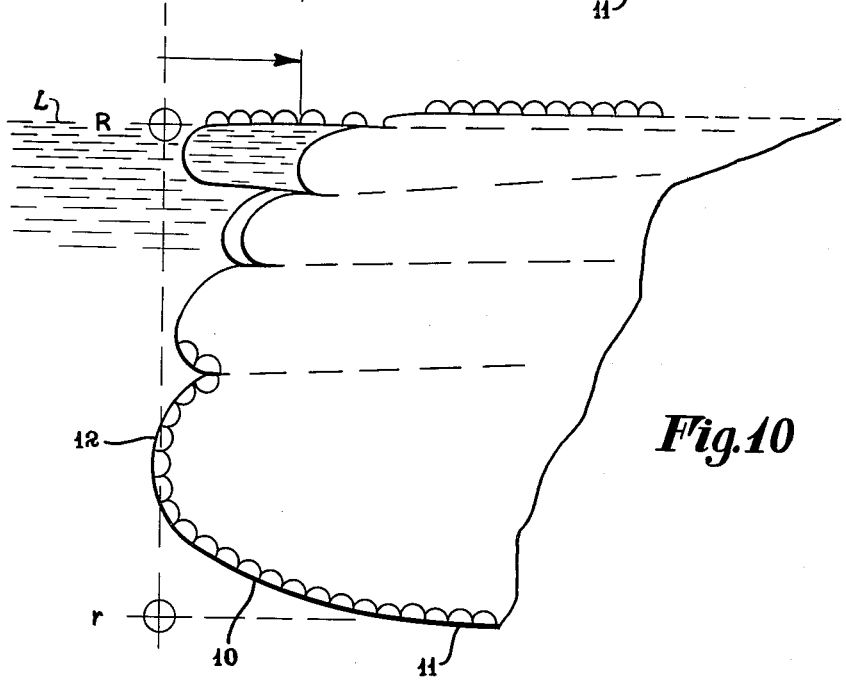

In Figure 10, where the wave is still building up and has reached its median height at the level R, it will be seen that the bottom 11 of the carrier will remain at substantially the same level as in Figure 9, or arise only very slightly; whereas, the side wall 12 will have extended upwardly and inwardly and will remain afloat substantially at the level of the wave surface. The buoyant tendency of the lower levels to rise is slowed down and at least partially overcome by the bulk and weight of the supplementary floats above.

Figure 11:
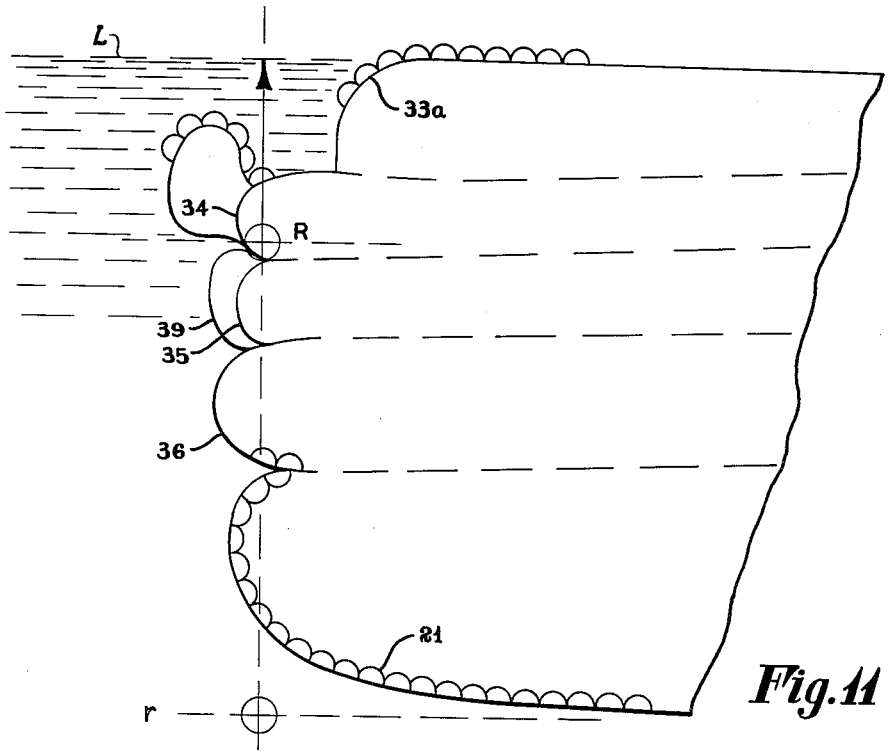

In Figure 11, when the wave has reached its crest, it will be seen that the side 12 is fully upwardly extended and that its upper portion is still at the level of the wave crest, as is the liquid contents of the carrier, this level being appreciably above the reference level R. At this time the bottom 11 of the envelope will have risen but very slightly from the position of Figure 9, as indicated by the reference point or level r, which is indicated in each of Figures 9 to 12, inclusive. The figure indicates the ease of the supplementary fold 33a in accommodating the upper portion of the wave, as well as the buoyancy of the supplementary floats when submerged, stretching upward the folds below them.

Figure 12:
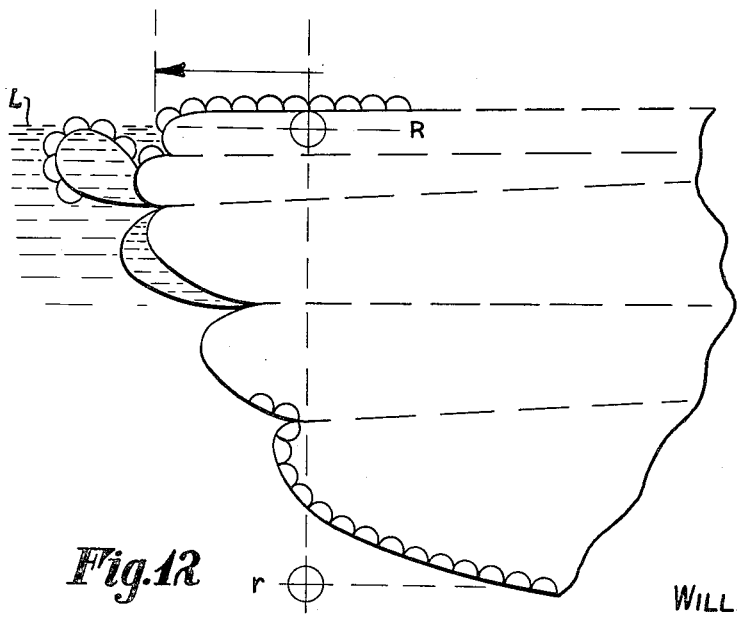

In Figure 12, the same portions shown in preceding Figures 9 to 11 are shown in the positions which they have assumed after the wave has passed its crest and has fallen back to the reference level R. At this time, the bottom 11 will have lowered but slightly to approximately the same position as in Figure 10, while the side wall 12, in moving outward, will have collapsed partially in a vertical direction, with the adjacent liquids.

The tendency of the portions extended outward to sink, shown by the arrow, is countered by the buoyancy of the supplementary floats, as well as the air floats.

When the wave reaches its trough, the parts will then be in the same position as above described in Figure 9, and the same cycle will be repeated at this location during each wave cycle.

Figure 4:
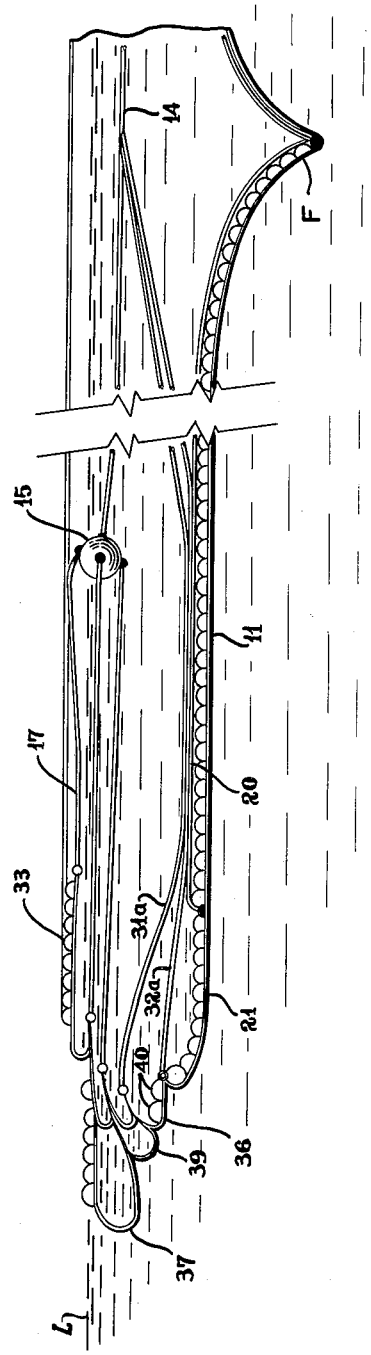
Figure 4 is a view similar to Figure 3, but showing the structure when in substantially emptied condition, as in Figure 2.
Figure 5:
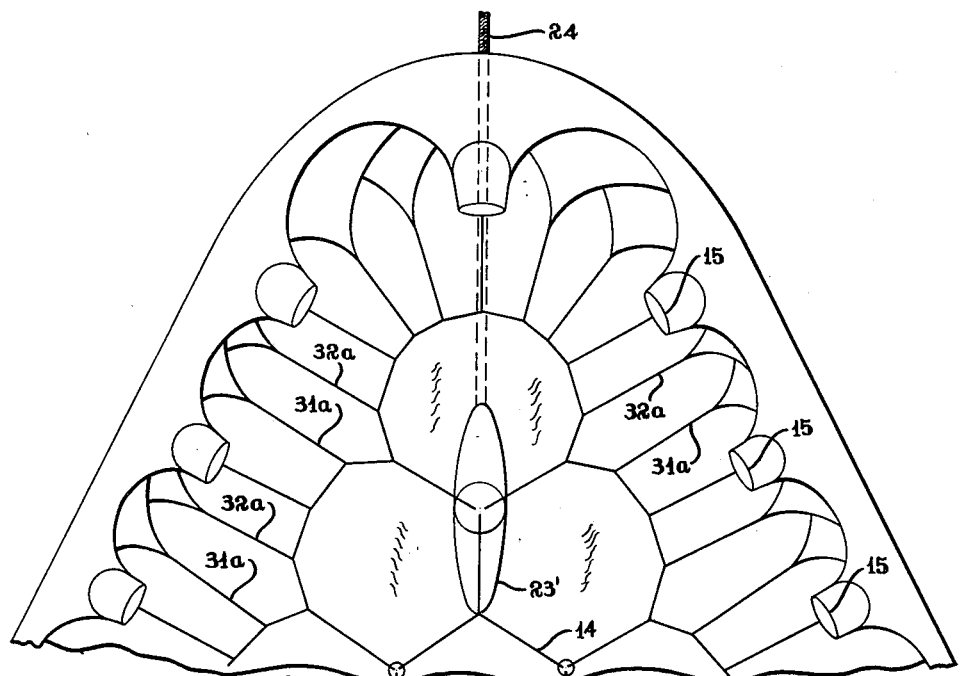
Figure 5 is a fragmentary plan view of the bow portion of the carrier of Figure 1, but taken on an enlarged scale and showing more structural details, which were omitted from Figure 1, due to the comparatively small scale of that figure.
Figure 6:
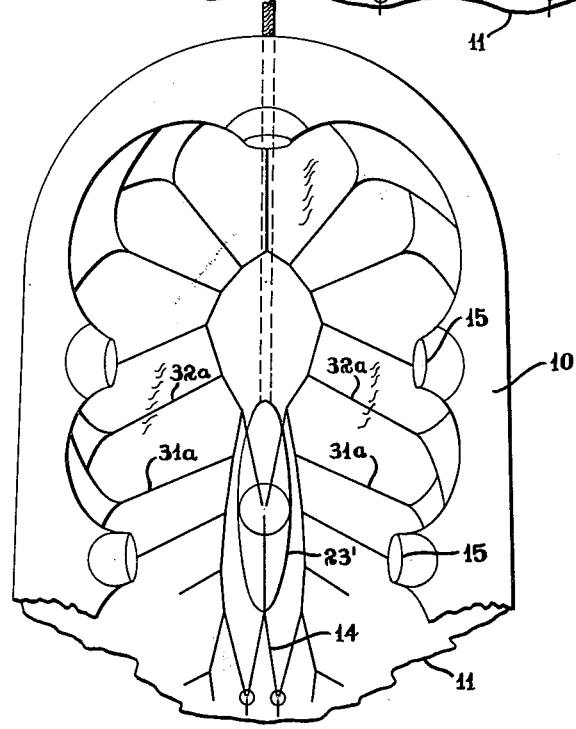
Figure 6 shows a further detailed view, similar to Figure 5, but showing the structure as it will appear in substantially empty condition.
Figure 7:
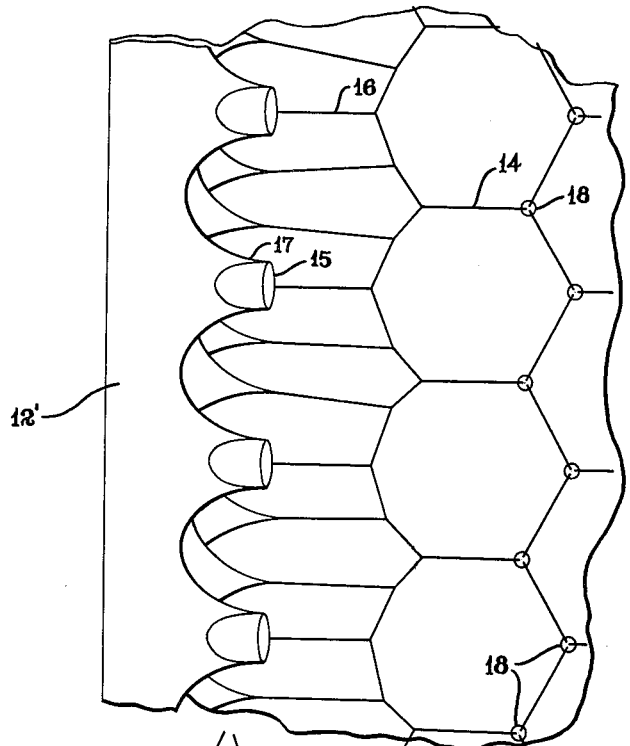
Figure 7 is an enlarged fragmentary plan view of one side of the structure shown in Figure 1, as it appears with the carrier filled with liquid cargo.
Figure 8:
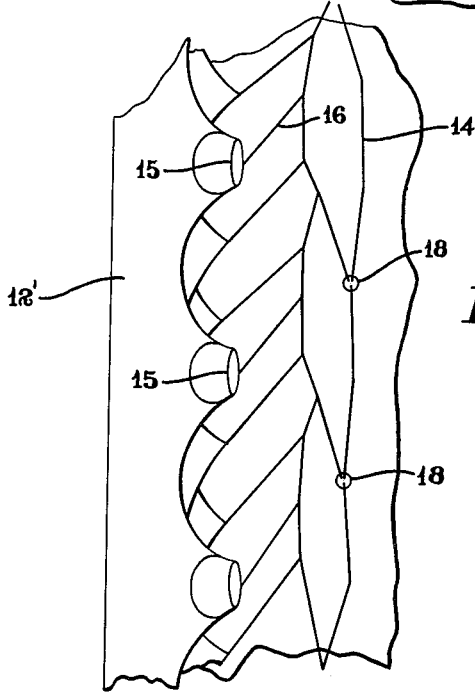
Figure 8 is a view similar to Figure 7, but showing the same structure as it appears with the carrier substantially empty.

When the carrier has been emptied or substantially emptied of its contents, it will when at rest normally retain very much the same shape in plan as is shown in Figure 1. However, by virtue of the floats on its bottom and side wall portions, its side walls will have collapsed upwardly from the bottom and the bottom similarly will have moved upwardly so that the parts will assume the positions and shapes generally as indicated in Figure 4. Normally the carrier will not be completely emptied of its contents, but some will be retained to maintain the form of the structure, for the return trip of the carrier. It will be noted that the bottom portions of the carrier structure, when substantially emptied, will normally assume the shape of a series of depending folds as shown in Figure 4, and as designated by the reference character F. These folds are simply the stretchable material of the bottom sustained by hydrostatic pressure from below to support the relatively heavy main cables of the bottom. Alternatively, if fresh-water floats of adequate size were utilized, these cables would be supported higher than shown, but still below the general plans of the bottom.

When the substantially emptied carrier is towed, it will be again caused to assume an elongated and relatively narrowed position such as illustrated in Figure 2, with correspondingly decreased resistance to its forward movement.

The filling and emptying of the carrier may be readily accomplished by conventional means constituting no essential part of this invention, it being obvious that this may be accomplished by means of pipes or conduits supported above and extending across the side wall portion of the carrier.

In this application I have shown and described only the preferred embodiment of the invention, in order to bring forth the best mode contemplated by me of carryin out the invention. However, I realize that the invention is capable of numerous modifications and that its several details may be modified in various ways, all without departing from the plan mentioned and defined in the accompanying claims. Accordingly, the drawings and description herein are to be construed as merely illustrative in nature and not as restrictive.

Having thus described my invention, I claim:

1. A bulk liquid carrier comprising an upwardly opening flexible liquid-impervious envelope of substantially oval shape in plan having a generally horizontal bottom and an upwardly directed collapsible marginal wall peripherally surrounding said bottom, a horizontally disposed and horizontally deformable upper network constructed of flexible tension members fixedly interconnected to each other to define a series of deformable polygons, said upper network extending across the upward opening in said envelope and connected to the upper peripheral edge of said wall at a plurality of locations around said wall, floats connected to and buoyantly supporting said upper network near the upper surface of any liquid confined in said envelope, a generally similar lower tension member network supported on the said bottom of the envelope substantially coextensively and in general vertical registry with said upper network, said lower network being secured to said bottom at a multiplicity of locations, means interconnecting said upper and lower networks to limit relative lateral displacement of said networks from their registering positions, both said networks having the inherent characteristic of being simultaneously stretchable in the direction of tow and contractible in a relatively transverse direction, and vice versa, incident to the exertion of towing and wave forces thereon, and means symmetrical to the major axis of said oval envelope for connecting a tow line to one of said networks adjacent its peripheral edge.

2. A bulk liquid carrier as defined in claim 1, including additional tension elements extending from one of said networks, and secured to said marginal wall respectively at a plurality of different levels, for opposing the internal pressure exerted on said wall by the liquid confined within said envelope.

3. A bulk liquid carrier as defined in claim 1, including additional tension elements extending from one of said networks and secured to said marginal wall respectively at a plurality of different levels, and at a plurality of locations around the wall in each said level, for thus defining a plurality of inwardly directed accordion pleats at the respective levels for facilitating vertical contraction and expansion of different portions of the wall incident to wave action without requiring stretching of the sheath material from top to bottom, and also incident to filling and emptying of the carrier.

4. A bulk liquid carrier as defined in claim 3, including means defining a plurality of relatively vertically adjoining hollow flexible compartments around and exteriorly of carrier envelope wall between relatively adjoining said upper levels, for reception of a buoyant fluid.

5. A bulk liquid carrier as defined in claim 4, wherein said compartments are filled with a fluid of slightly less density than salt water, to provide a buoyant rising and falling sustaining action on the walls when pulled downward by wave action such as will minimize spillage of the carrier contents, and also to provide weight and bulk to prevent the rise of lower folds when extended forward by wave action relative to upper folds.

6. A bulk liquid carrier as defined in claim 1, including float means secured to and extending around the marginal upper edge portion of said wall to maintain same above the surface of a body of liquid in which said carrier floats.

7. A bulk liquid carrier as defined in claim 1, including air-inflated float means secured to and extending around the marginal upper edge portion of said wall to maintain said edge above the surface of the liquid contents of said carrier.

8. A bulk liquid carrier as defined in claim 1, including float means secured to and extending around the marginal upper edge portion of said wall to maintain same above the surface of the liquid both within said carrier and within which it floats.

9. A bulk liquid carrier as defined in claim 1, including float means formed on said bottom.

10. A bulk liquid carrier as defined in claim 1, which includes one or more rigid elements extending vertically between and secured to both said upper and lower networks of said oval carrier, of which at least one element would be attached near one end of said carrier, said element projecting in liquid-tight manner through and beneath the said bottom of the carrier, and said projecting portion defining tow line connection means symmetrical to said major axis.

11. A bulk liquid carrier comprising an upwardly opening flexible liquid-impervious envelope of substantially oval shape in plan having a generally horizontal bottom and an upwardly directed collapsible marginal wall peripherally surrounding said bottom, a horizontally disposed and horizontally deformable upper cable network of substantially constant length flexible tension members extending across the upward opening in said envelope and connected to the upper peripheral edge of said wall at a plurality of locations around said wall, floats connected to said wall for buoyantly supporting same within a body of liquid, a generally similar lower tension member network supported on the said bottom of the envelope substantially coextensively and in general vertical registry with said upper network, said lower network being secured to said bottom at a multiplicity of locations, means interconnecting said upper and lower networks to resist relative lateral displacement of said networks from their registering positions, both said networks having the inherent characteristic of being simultaneously stretchable in the direction of tow and contractible in a relatively transverse direction, and vice versa, incident to the exertion of towing and wave forces thereon, and means symmetrical to the major axis of said oval envelope for connecting a tow line to one of said networks adjacent its peripheral edge.

12. A bulk liquid carrier comprising an upwardly opening flexible liquid-impervious envelope of substantially oval shape in plan having a generally horizontal bottom and an upwardly directed collapsible marginal wall peripherally surrounding said bottom, a horizontally disposed and horizontally deformable cable network of substantially constant length flexible tension members extending across the upward opening in said envelope and connected to the upper peripheral edge of said wall at a plurality of locations around said wall, floats connected to the upper edge portion of said wall for buoyantly supporting same within a body of liquid, said network having the inherent characteristic of being simultaneously stretchable in the direction of tow and contractible in a relatively transverse direction, and vice versa, incident to the exertion of towing and wave forces thereon, and means symmetrical to the major axis of said oval envelope for connecting a tow line to said network adjacent its peripheral edge.

13. A bulk liquid carrier as defined in claim 12, including secondary tension elements forming part of said cable network, various of said secondary elements being secured to said marginal wall at a plurality of different levels and at a plurality of locations around said wall.

14. A bulk liquid carrier comprising an upwardly opening flexible liquid-impervious envelope of substantially oval shape in plan, having a generally horizontal bottom and an upwardly directed collapsible marginal wall peripherally surrounding said bottom, a horizontally disposed and horizontally deformable upper element extending across the upward opening in said envelope and connected to the upper peripheral edge of said wall at a plurality of locations around said wall, floats connected to the upper edge portion of said wall for buoyantly supporting same within a body of liquid, a lower element generally similar to said upper element supported on the said bottom of the envelope substantially coextensively and in general vertical registry with said upper element, said lower element being secured to said bottom at a multiplicity of locations, means interconnecting said upper and lower elements to resist relative lateral displacement of said elements from their registering positions, both said elements having the inherent characteristic of being simultaneously stretchable in the direction of tow and contractible in a relatively transverse direction, and vice versa, incident to the exertion of towing and wave forces thereon, and means symmetrical to the major axis of said oval envelope for connecting a tow line to one of said elements.

15. A bulk liquid carrier as defined in claim 14, wherein said tow line is connected to said lower element.

16. A bulk liquid carrier comprising an upwardly opening flexible liquid-impervious envelope of substantially oval shape in plan, having a generally horizontal bottom and an upwardly directed collapsible marginal wall peripherally surrounding said bottom, floats connected to said wall for supporting the upper edge thereof above the level of a body of liquid, a horizontally disposed and horizontally deformable upper element extending across the upward opening in said envelope and connected to the upper peripheral edge of said wall at a plurality of locations around said wall, a horizontally disposed and deformable lower element supported on the said bottom of the envelope substantially coextensively and in general vertical registry with said upper element, said lower elements being secured to the marginal area of said bottom at a multiplicity of locations therearound, both said elements having the inherent characteristic of being simultaneously stretchable in the direction of tow and contractible in a relatively transverse direction incident to the exertion of towing forces thereon, and means symmetrical to the major axis of said oval envelope for connecting a tow line to said elements.

References Cited in the file of this patent

UNITED STATES PATENTS

| | | |
|---|---|---|
| Re. 22,876 | Gray et al. | May 13, 1947 |
| 2,377,989 | Braun | June 12, 1945 |
| 2,391,926 | Scott | Jan. 1, 1946 |
| 2,854,049 | Wyllie | Sept. 30, 1958 |

FOREIGN PATENTS

| | | |
|---|---|---|
| 821,195 | Great Britain | Sept. 30, 1959 |